Jan. 21, 1947.  L. L. LAKATOS  2,414,537
INDICATOR FOR RADIO PULSE-ECHO SYSTEMS
Filed May 28, 1943
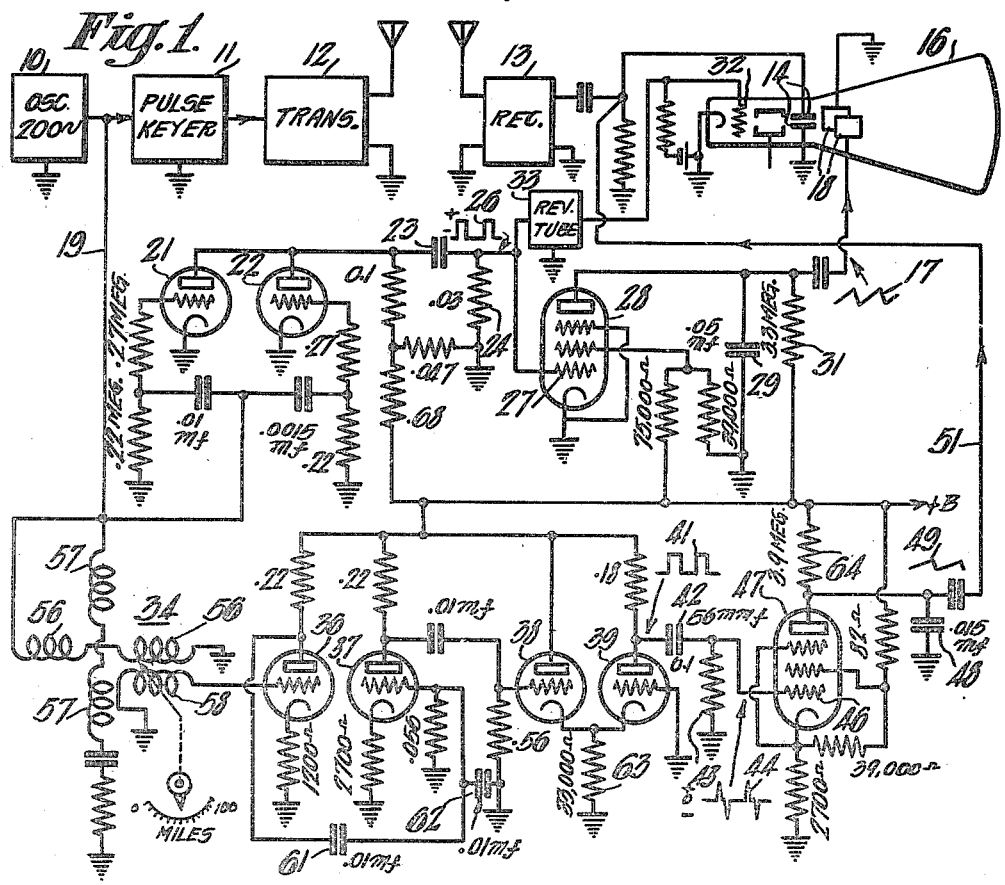
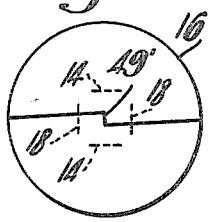
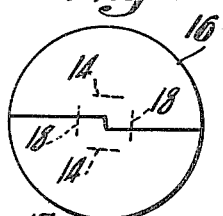
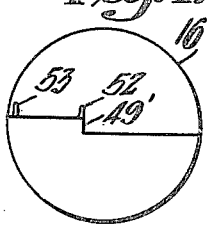
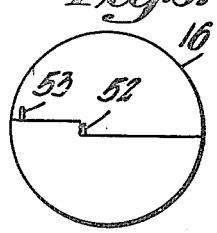
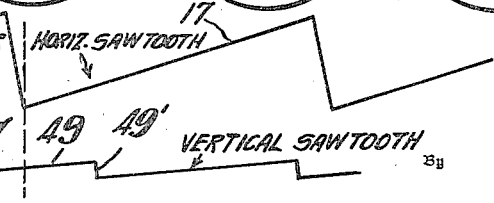
Inventor
Louis L. Lakatos
By
Attorney Patented Jan. 21, 1947

2,414,537

UNITED STATES PATENT OFFICE 2,414,537

INDICATOR FOR RADIO PULSE-ECHO SYSTEMS

Louis L. Lakatos, Bala Cynwyd, Pa., assignor to Radio Corporation of America, a corporation of Delaware Application May 28, 1943, Serial No. 488,925

7 Claims. (Cl. 315—24)

My invention relates to pulse-echo distance determining systems and particularly to an improved cathode ray tube indicator for such systems.

An object of the invention is to provide an improved cathode ray tube indicator system by means of which the position of a received pulse on the tube screen may be clearly indicated.

A further object of the invention is to provide an improved method of and means for indicating the time interval between two indications appearing on a cathode ray tube screen.

In one preferred embodiment of the invention, a saw-tooth wave deflects the electron beam of a cathode ray tube along a horizontal time axis while the received signal pulses deflect the beam vertically to produce an indication each time a pulse is received. Instead of using a distance calibrated scale adjacent to the time axis for determining the distance to the object that reflected a particular pulse, I utilize an adjustable "stepped" wave to deflect the cathode ray vertically. The step in this wave may be shifted along the time axis by means of an adjustable phase shifter that is provided for shifting the phase of the stepped wave whereby its "step" may be made to coincide with the reflected pulse indication that is of interest. The phase shifter is calibrated so that its position after this adjustment gives the desired distance reading.

In accordance with my invention the "stepped" wave is a sawtooth wave which deflects the cathode ray only a small amount in the vertical direction. The trace on the screen produced by this vertical sawtooth and by the horizontal sawtooth is made to appear as a stepped wave by having the return trace of the vertical sawtooth occur during the horizontal time sweep and by rotating the entire cathode ray tube a small amount so that the trace, except for its return line portion, is horizontal; the return line portion or "step" is vertical.

The invention will be better understood from the following description taken in connection with the accompanying drawing in which Figure 1 is a block and circuit diagram of a radio pulse-echo system embodying my invention, Figure 2 is a view of the cathode ray trace as it appears on the indicator tube 1 before the tube is rotated a slight amount in the clockwise direction, Figure 3 is a view of the cathode ray trace appearing on the end of the indicator tube in Fig. 1 after the tube has been rotated a few degrees, Figures 4 and 5 are views of the cathode ray traces on the end of the indicator tube of Fig. 1 during the reception of a reflected pulse and for two different phase adjustments of the stepped wave, and Figures 6 and 7 are graphs of the horizontal and vertical deflecting voltages, respectively, that are applied to the cathode ray indicator tube.

Referring to Fig. 1, the pulse transmitter comprises a sine wave oscillator 10 operating at any desired frequency such as 200 cycles per second. The sine wave signal is supplied to a pulse keyer circuit 11 which produces periodically recurring pulses that key or modulate a radio transmitter 12. Each keying pulse is of only a few microseconds duration. The repetition rate in this particular example of the invention is 200 per second.

A receiver 13 receives and demodulates the radio pulses after they are reflected by the object to be located. The reflected pulses are then applied to the vertical deflecting plates 14 of a cathode ray indicator tube 16. A timing or horizontal sweep voltage 17 of sawtooth wave form is applied to the horizontal deflecting plates 18, this sawtooth voltage occurring synchronously with the pulse transmission. It is produced, in the example illustrated, by supplying signal from the oscillator 10 over a conductor 19 to a pair of vacuum tubes 21 and 22 which produce a rectangular wave in a manner described hereinafter. The function of the .047 megohm resistor between the resistor 24 and the plate resistor of tube 22 is to limit the maximum plate voltage on tube 22 and thus to clip one side of the plate voltage wave. The rectangular wave is differentiated by passing it through a capacitor 23 and a resistor 24 to produce narrow positive voltage pulses 26. The pulses 26 are applied to the control grid 27 of a vacuum tube 28 to discharge a capacitor 29 periodically whereby the sawtooth voltage 17 appears across it. The charging circuit for capacitor 29 is through the anode resistor 31 of the tube 28.

The horizontal return trace of the cathode ray is blanked out by applying the pulses 26 to the control grid 32 of the tube 16 after reversing their polarity in a reversing tube 33.

With the system thus far described the distance of a reflecting object can be determined by noting the position of the reflected pulse indication along a calibrated distance scale. The additional part of the system which will now be described is for the purpose of obtaining the distance indication from the setting of an adjustable phase shifter 34 which is calibrated in miles or other distance units.

Sine wave voltage from the oscillator 10 is passed through the phase shifter 34, a pair of amplifier tubes 36 and 37, and a pair of clipper tubes 38 and 39 for producing a square wave 41 which is differentiated by the capacitor-resistor circuit 42—43 to obtain narrow positive pulses 44. The pulses 44 are applied to the grid 46 of a vacuum tube 47 to discharge a capacitor 48 periodically and produce a small amplitude sawtooth voltage wave 49 thereacross. The wave 47, which has the same frequency as the horizontal deflecting wave 17, is supplied over a conductor 51 to the vertical deflecting plates 14.

The vertical return trace 49' of the wave 49 is made to occur during the horizontal sweep produced by the sawtooth wave 17 as illustrated by Figs. 6 and 7. By adjusting the phase shifter 34, the return trace 49' may be moved to any desired position along the wave 17. Fig. 2 shows the resulting trace on the cathode ray tube screen when the tube 16 is in the usual position, i. e., when the deflecting plates 14 produce deflection in the vertical plane.

By rotating the cathode ray tube 16 to the position shown in Fig. 3, a rotation of about 6 degrees in the example assumed, the trace along the time axis is made horizontal and the return trace or step 49' is made vertical. The return trace 49' is exactly vertical only if, as illustrated in Fig. 7, it makes an angle of 90 degrees with the gradually sloping portion of the sawtooth 49 as preferably is the case.

Assuming now that there is a reflected pulse indication 52 on the tube screen, the corresponding transmitted pulse indication appearing at 53, the phase shifter 34 is adjusted to move the step 49' along the time axis until it is under the pulse indication 52. Now a very slight shift in the position of the step 49' causes the pulse indication 52 either to be raised to the position shown in Fig. 4 or to be lowered to the position shown in Fig. 5. In this way the phase shifter setting or adjustment which corresponds to the position of the pulse indication 52 may be determined accurately, and the distance indication can be read off the distance scale of the phase shifter.

The phase shifter 34 may be of a well known type, similar to a goniometer, comprising windings 56 and 57 positioned at right angles to each other and having currents approximately 90 degrees out of phase flowing through them to produce a rotating field. A rotatable coil 58 is located in this field whereby the phase of the sine wave voltage applied to amplifier tube 36 depends upon the angular position of coil 58.

The amplifier tubes 36 and 37 are merely for amplifying the sine wave voltage enough to obtain square waves by clipping. The capacitors 61 and 62 act as a voltage divider to reduce the voltage applied to the tube 37. The capacitor 62 also reduces the harmonic components introduced by the amplifier tube 36. The output circuit of clipping tube 38 is cathode coupled through resistor 63 to the input electrodes of the clipping tube 39 whereby both positive and negative half cycles of the sine wave voltage are clipped, thus producing the square wave 41. The sawtooth circuit comprising the capacitor 48 and the discharge tube 47 is conventional, the capacitor 48 being charged through the anode resistor 64 of tube 47 while the tube 47 is biased to cutoff.

In the drawing, the values of various circuit elements have been indicated, by way of example, in ohms, megohms, microfarads, and micro-microfarads. The resistance values, unless otherwise indicated, are in megohms.

I claim as my invention:

1. In a system for determining the time interval between two signals, a cathode ray tube having a screen along which the cathode ray may be deflected to produce a trace, means for deflecting the cathode ray along a time axis, means for deflecting the cathode ray substantially at right angles to said time axis by said signals to produce signal indications on said screen, means for also deflecting said cathode ray substantially at right angles to said time axis by a small amplitude sawtooth wave whereby the time axis trace has a step therein produced by the return trace of said sawtooth wave, and means for shifting the phase of said sawtooth wave for moving said step along the time axis.

2. The invention according to claim 1 wherein the cathode ray tube is rotated a few degrees about its longitudinal axis to a position where the time axis is horizontal and where said return trace is substantially vertical.

3. In a system for determining the time interval between two signals, a cathode ray tube having a screen along which the cathode ray may be deflected to produce a trace, means for deflecting the cathode ray along a time axis by a sawtooth wave having a certain repetition frequency, means for deflecting the cathode ray substantially at right angles to said time axis by said signals to produce signal indications on said screen, means for also deflecting said cathode ray substantially at right angles to said time axis by a small amplitude sawtooth wave having said certain repetition frequency and having its return trace located on said time axis, and means for shifting the phase of said small amplitude sawtooth wave for moving said return trace along the time axis.

4. The invention according to claim 3 wherein the cathode ray tube is rotated a few degrees about its longitudinal axis to a position where the time axis is horizontal and where said return trace is substantially vertical.

5. In a system for determining the time interval between the transmission of a pulse and the reception of said pulse after reflection, a cathode ray tube having a screen along which the cathode ray may be deflected to produce a trace, means for deflecting the cathode ray along a time axis, means for deflecting the cathode ray substantially at right angles to said time axis by said pulses to produce signal indications on said screen, means for producing a sawtooth having a gradually sloping portion and a steeply sloping portion which are substantially at right angles to each other, means for also deflecting said cathode ray substantially at right angles to said time axis by said last sawtooth wave whereby the time axis trace has a step therein produced by the return trace of said last sawtooth wave, and means for shifting the phase of said sawtooth wave for moving said step along the time axis to the region of the reflected pulse indication.

6. The invention according to claim 5 wherein the cathode ray tube is rotated a few degrees about its longitudinal axis to a position where the time axis is horizontal and where said return trace is substantially vertical.

7. In a system having a cathode ray indicator tube in which there is a screen along which the cathode ray may be deflected to produce a trace, the method of determining the time interval between two signals which comprises deflecting the cathode ray along a time axis, deflecting the cathode ray substantially at right angles to said time axis by said signals to produce signal indications on said screen, simultaneously deflecting said cathode ray substantially at right angles to said time axis by a small amplitude sawtooth wave which is phased to make its return trace occur during the timing deflection whereby the time axis trace has a step therein produced by the return trace, and shifting the phase of said sawtooth wave for moving said step along the time axis to the region of a signal indication.

LOUIS L. LAKATOS.